United States Patent Office 3,529,004
Patented Sept. 15, 1970

3,529,004
TRIMETHYLSILYLMETHYL DERIVATIVES OF
SUBSTITUTED BENZYLAMINES
William E. Weesner, Kettering, and John L. Schaar,
Dayton, Ohio, assignors to Monsanto Research Corporation, St. Louis, Mo., a corporation of Delaware
No Drawing. Filed Feb. 23, 1968, Ser. No. 707,400
Int. Cl. C07f 7/10
U.S. Cl. 260—448.2                             2 Claims

ABSTRACT OF THE DISCLOSURE

The organosilicon compounds represented by the formula

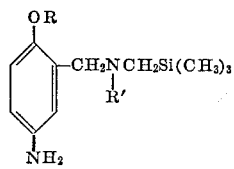

where R and R' are selected from the group consisting of methyl, ethyl and propyl; and their hydrochlorides. The novel compounds are useful as herbicides and corrosion inhibitors.

---

The invention herein described was made in the course of or under a contract with the Department of the Army.

BACKGROUND OF THE INVENTION

This invention pretains to silicon-containing carbon compounds and more particularly to certain trimethylsilylmethyl derivatives of substituted benzylamines. The invention is further directed to the production of biological toxicant compounds.

SUMMARY OF THE INVENTION

An object of this invention is to provide novel organosilicon compounds having utility as biological toxicants. Another object is the provision of new selective herbicides.

These and other objects hereinafter defined are met by the invention wherein there is provided an organosilicon compound of the formula

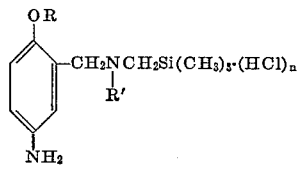

where R and R' are selected from the group consisting of methyl, ethyl andp ropyl, and $n$ is an integer of from 0 to 2.

The organosilicon compounds of the present invention may be prepared by several methods. As a preferred method, a nitro intermediate may be prepared by reaction of a substituted nitrobenzylamine with bromomethyltrimethylsilane as follows:

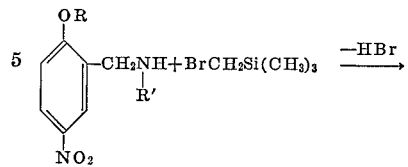

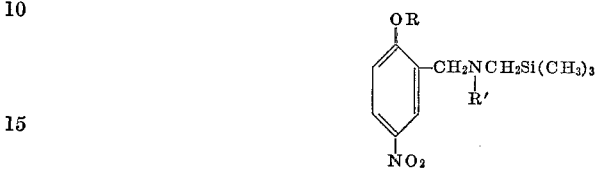

Thereafter, the nitro intermediate may be reduced with hydrogen in the presence of a catalyst to yield the desired amine product:

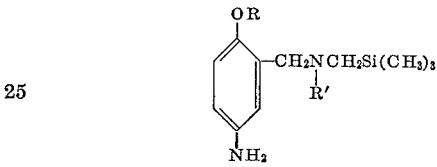

By addition of hydrogen chloride there may be prepared either the mono- or dihydrochlorides. The hydrochlorides are generally solids that are soluble in water or ethanol and are useful as biological toxicants as will be hereinafter disclosed.

Specific examples of the substituted nitrobenzylamines useful in preparing the nitro intermediates are: N-methyl-2-methoxy-, N-methyl-2-ethoxy-, N-methyl-2-propoxy-, N-ethyl-2-methoxy-, N-ethyl-2-propoxy-, N-propyl-2-methoxy-5-nitrobenzylamine, etc.

Specific examples of the amine products are:

N-methyl-N-trimethylsilylmethyl-5-amino-2-methoxy-
 benzylamine,
N-methyl-N-trimethylsilylmethyl-5-amino-2-ethoxy-
 benzylamine,
N-ethyl-N-trimethylsilylmethyl-5-amino-2-methoxy-
 benzylamine,
N-ethyl-N-trimethylsilylmethyl-5-amino-2-ethoxy-
 benzylamine, etc.

The amine products may be employed as corrosion inhibitors, e.g., in automobile cooling systems employing circulating water. For this purpose a concentration of between 0.1–2.0% by weight is sufficient.

The hydrochlorides of this invention are particularly useful as herbicides, especially for post-emergence spray for control of undesired vegetation. For this purpose the active ingredient may be dissolved in a solvent, or dispersed in an emulsion or even a dusting formulation so that the active ingredient may be applied to the soil or plant surfaces in a toxic concentration in a form which enables prompt assimilation by the germinating seeds, emerging seedlings, or full grown plants. There may also be added various surface active agents as wetting or emulsifying agents, e.g., water-soluble salts of long-chain carboxylic acids, sulfonated animal, vegetable or mineral oils, etc.

DESCRIPTION OF THE PREFERRED EMBODIMENTS

The invention is further illustrated by, but not limited to, the following examples.

Example 1

This example illustrates the prepartion of N-ethyl-N-trimethylsilylmethyl-5-amino - 2 - methoxybenzylamine dihydrochloride:

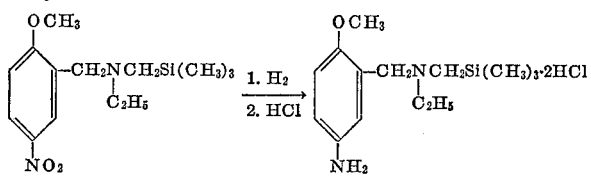

There was first prepared a nitro intermediate, N-ethyl-N-trimethylsilylmethyl-2-methoxy - 5 - nitrobenzylamine, by reaction of 42 g. (0.2 mole) of N-ethyl-2-methoxy-5-nitrobenzylamine, 33.4 g. (0.2 mole) of bromomethyltrimethylsilane, and 20.2 g. (0.2 mole) of triethylamine in 175 ml. of 1:1 (by volume) dimethylformamide/benzene. The reaction mixture was heated 18 hours at 98° C. It was then cooled and filtered to remove triethylamine hydrobromide (31.8 g., 88% of theory). The solvent was removed on a rotary evaporator (80° C./1 mm. final conditions) leaving an oil which could not be crystallized. It was decolorized in 300 ml. hexane/20 ml. ethanol, and the hydrochloride salt prepared by bubbling anhydrous HCl into an ether/2-butanone solution. The 54.6 g. of crude solid obtained was crystallized from 300 ml. of 2-butanone/100 ml. of methanol to give 17.3 g. of pure N-ethyl-N-trimethylsilylmethyl - 2 - methoxy - 5 - nitrobenzylamine hydrochloride, M.P. 179–180° C. (dec.). An additional 32.4 g. (M.P. 176–177° C., dec.) was obtained in a second crop to give a 75% overall yield.

Calcd. for $C_{14}H_{24}N_2O_3Si \cdot HCl$ (percent): C, 50.51; H, 7.57; Cl, 10.65; N, 8.42; Si, 8.44. Found (percent): C, 50.54; H, 7.67; Cl, 10.74; N, 8.67; Si, 8.61.

N-ethyl-N-trimethylsilylmethyl - 5 - amino-2-methoxybenzylamine, the desired compound, was prepared by combining 44.2 g. (0.13 mole) of the intermediate above (as the hydrochloride), 0.5 g. of 10% palladium-on-carbon, and 200 ml. of absolute ethanol in a 300 ml. glass Parr hydrogenation vessel. The contents were pressured to 49.5 p.s.i. with hydrogen at 25° C. The temperature rose to 45° C., during a 1 hour reaction period, and the hydrogen up-take was 44.5 p.s.i. The catalyst was removed by filtration, and the solvent evaporated to leave 38.4 g. of crude, semi-crystalline monohydrochloride. This residue was dissolved in 100 ml. of ethanol, decolorized, and saturated with anhydrous HCl. Solvent evaporation and trituration with ether gave a solid which was crystallized once from 400 ml. of 2-butanone/75 ml. of ethanol and twice from 500 ml. of 2-butanone/60 ml. of ethanol to give 17.5 g. (39% yield) of N-ethyl-N-trimethylsilylmethyl-5-amino-2 - methoxybenzylamine dihydrochloride, M.P. 170–172° C.

Calcd. for $C_{14}H_{26}N_2OSi \cdot 2HCl$ (percent): C, 49.55; H, 8.31; Cl, 20.89; N, 8.26; Si, 8.28. Found (percent): C, 49.23; H, 8.86; Cl, 20.78; N, 8.23; Si, 8.28.

Example 2

This example illustrates the application of the product of Example 1 as a herbicide.

A solution of N-ethyl-N-trimethylsilylmethyl-5-amino-2-methoxybenzylamine dihydrochloride in 0.5% concentration in acetone-water, together with a sulfonate-type emulsifying agent, was applied to 2-week old plants. The injuries to the plants were observed 2 weeks later. Sorghum, tomato, soybean, and brome grass were entirely unharmed, whereas growth of wild buckwheat and pigweed was entirely or considerably suppressed.

It is to be understood that although the invention has been described with specific reference to particular embodiments thereof, it is not to be so limited since changes and alterations therein may be made which are within the full intended scope of this invention as defined by the appended claims.

What we claim is:

1. An organosilicon compound of the formula

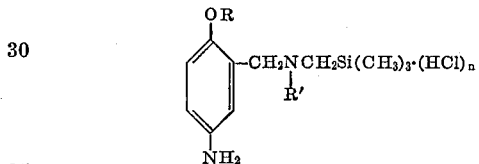

wherein R and R' are selected from the group consisting of methyl, ethyl and propyl, and $n$ is an integer of from 0 to 2.

2. The compound of claim 1 wherein R is methyl, R' is ethyl and $n$ is 2.

References Cited

UNITED STATES PATENTS

| | | |
|---|---|---|
| 2,927,839 | 3/1960 | Bailey et al. |
| 2,931,693 | 4/1960 | Bailey et al. |
| 2,955,898 | 10/1960 | Bailey et al. |
| 2,955,899 | 10/1960 | Bailey et al. |
| 3,288,754 | 11/1966 | Green. |

HELEN M. McCARTHY, Primary Examiner

P. F. SHAVER, Assistant Examiner

U.S. Cl. X.R.

71—121; 252—389; 424—184